US011485514B2

United States Patent
Kravchenko et al.

(10) Patent No.: US 11,485,514 B2
(45) Date of Patent: Nov. 1, 2022

(54) RAM AIR TURBINE SYSTEMS

(71) Applicant: Hamilton Sundstrand Corporation, Charlotte, NC (US)

(72) Inventors: Mykola Kravchenko, Madison, WI (US); Robert L. Seagren, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 415 days.

(21) Appl. No.: 16/736,544

(22) Filed: Jan. 7, 2020

(65) Prior Publication Data
US 2021/0206506 A1 Jul. 8, 2021

(51) Int. Cl.
*B64D 41/00* (2006.01)
*F03D 9/25* (2016.01)
*F02N 11/04* (2006.01)

(52) U.S. Cl.
CPC .............. *B64D 41/007* (2013.01); *F03D 9/25* (2016.05); *B64D 2221/00* (2013.01); *F02N 11/04* (2013.01); *F05B 2220/50* (2013.01); *F05B 2220/706* (2013.01); *F05D 2220/34* (2013.01)

(58) Field of Classification Search
CPC ..... B64D 41/007; B64D 2221/00; F03D 9/25; F02N 11/04; F05B 2220/50; F05B 2220/706
See application file for complete search history.

(56) References Cited

U.S. PATENT DOCUMENTS

| | | | |
|---|---|---|---|
| 6,256,213 | B1 | 7/2001 | Illingworth |
| 6,256,977 | B1 | 7/2001 | McGinley et al. |
| 9,083,201 | B2 | 7/2015 | Bauer et al. |
| 9,494,124 | B2 | 11/2016 | Dudley |
| 10,279,759 | B2 | 5/2019 | Iwashima et al. |

(Continued)

FOREIGN PATENT DOCUMENTS

| | | |
|---|---|---|
| EP | 2112761 A2 | 10/2009 |
| EP | 2325975 A2 | 5/2011 |
| EP | 3543143 A1 | 9/2019 |

OTHER PUBLICATIONS

Rafal K et al: "Hybridization of an aircraft emergency electrical network: Experimentation and benefits validation", Vehicle Power and Propulsion Conference (VPPC), 2010 IEEE, IEEE, Sep. 1, 2010 (Sep. 1, 2010), pp. 1-6, XP031929123.

(Continued)

*Primary Examiner* — Sean Gugger
(74) *Attorney, Agent, or Firm* — Locke Lord LLP; Daniel J. Fiorello; Gabrielle Gelozin (57) ABSTRACT

A ram air turbine (RAT) system can include a generator configured to be turned by a RAT and to output an alternating current (AC) power, a generator control unit (GCU) configured to control an output of the generator, a rectifying module configured to rectify the AC power into a direct current (DC) power, and a DC load configured to receive the DC power from the rectifying module. The DC load can be operatively connected to the GCU to provide feedback from the DC load to the GCU. The GCU can be configured to control the output of the generator as a function of the feedback to prevent stalling of the RAT and/or doorbelling current and/or voltage in the system caused by disconnecting the generator from the DC load.

18 Claims, 4 Drawing Sheets

(56) References Cited

U.S. PATENT DOCUMENTS

| | | |
|---|---|---|
| 10,322,815 B1 | 6/2019 | Marks et al. |
| 2006/0083633 A1* | 4/2006 | Bannon ............... B64D 41/007 |
| | | 417/375 |
| 2013/0062943 A1* | 3/2013 | Bauer .................... H02J 9/066 |
| | | 307/23 |

OTHER PUBLICATIONS

Roboam X et al: "Hybrid power generation system for aircraft electrical emergency network", IET Electrical Systems in Transportation, The Institution of Engineering and Technology, Michael Faraday House, Six Hills Way, Stevenage, Herts. SG1 2AY, UK, vol. 1, No. 4, Dec. 6, 2011 (Dec. 6, 2011), pp. 148-155, XP006043255.

Extended European search report issued in corresponding EP application No. 21150613.4, dated May 20, 2021.

* cited by examiner

RAM AIR TURBINE SYSTEMS

FIELD

This disclosure relates to ram air turbines (RATs), e.g., for aircraft.

BACKGROUND

The emergency power system is comprised of a Ram Air Turbine (RAT) which drives a generator. The generator is controlled by a generator control unit (GCU), and can feed the AC essential load, for example. The RAT can also be responsible for supplying a DC essential load through an uncontrolled transformer rectifier unit (TRU), for example. Between the time that the RAT is offline to when it comes on, the DC essential load can be traditionally powered by a battery for a certain amount of time. The RAT can then be required to power the DC essential load when it comes online, as well as charge the battery back to full.

In traditional systems, the RAT is electrically rated to be as small as possible to minimize weight on the aircraft based upon the assumed total electrical load available during emergency conditions. During the transition to emergency operation the batteries are required to maintain the DC Essential load causing the batteries to discharge. When the RAT generator connects to the AC Bus and the TRU the batteries will recharge if the voltage levels are high enough. This recharge current combined with the existing base load can lead to an architectural issue where the RAT is severely overloaded. When the RAT comes online, the battery recharge current can force the RAT to stall. Stalling will cause the RAT generator to disconnect from the AC Essential Bus which is typically unacceptable. When the load is disconnected from the RAT the turbine speed increases and the RAT generator will automatically reconnected to the AC Essential bus thereby repeating the process. This process is considered "doorbelling".

Traditionally, this issue would require the use of a RAT generator with a higher electrical rating and weight. Such conventional methods and systems have generally been considered satisfactory for their intended purpose. However, there is still a need in the art for improved RAT systems. The present disclosure provides a solution for this need.

SUMMARY

In accordance with at least one aspect of this disclosure, a ram air turbine (RAT) system can include a generator configured to be turned by a RAT and to output an alternating current (AC) power, a generator control unit (GCU) configured to control an output of the generator, a rectifying module configured to rectify the AC power into a direct current (DC) power, and a DC load configured to receive the DC power from the rectifying module. The DC load can be operatively connected to the GCU to provide feedback from the DC load to the GCU. The GCU can be configured to control the output of the generator as a function of the feedback to prevent stalling of the RAT and/or doorbelling current and/or voltage in the system caused by disconnecting the generator from the DC load.

The GCU can be configured to reduce the output voltage of the generator to prevent RAT stalling when the feedback indicates a total load is at least large enough to cause stalling of the RAT and/or doorbelling voltage and/or current in the system. The system can further include a battery operatively connected to the DC load to power the DC load when the DC load is not receiving suitable power from the rectifying module.

The battery can be configured to be charged when the DC load is receiving DC power from the rectifying module such that the battery is configured to provide an additional load seen by the generator when the battery is at least partially discharged. The GCU can reduce an output AC voltage of the generator to reduce slowing of the RAT and generator.

The system can include a current sensor operatively connected to the DC load and the GCU. The DC load can be operatively connected to the GCU at least through the current sensor. The feedback can include current in the DC load sensed by the current sensor.

The system can include an AC contactor disposed between the generator and the rectifying module. The contactor can be configured to selectively connect or disconnect AC power to the rectifying module. The AC contactor can be configured to open or be opened when a total load seen by the generator exceeds a total load threshold. The additional load from the battery can be configured to cause the system to exceed the total load threshold at or below a state-of-charge (SOC) threshold of the battery such that the GCU is configured to reduce the output AC voltage to prevent opening of the AC contactor when the battery is at or below the SOC threshold.

The GCU can be configured to look up an output AC voltage value based on the DC feedback current in a look-up table. The GCU can be configured to receive output AC voltage of the generator and to control the AC output voltage of the generator as a function of the look-up table at least when the battery is below the SOC threshold. The look-up table can include a linear ramp such that the GCU linearly ramps output voltage at least when the battery is below the SOC threshold.

In certain embodiments, the rectifying module is a transformer rectifier unit (TRU). The system can further include an AC load disposed between the AC contactor and the TRU to be operatively connected to the generator to receive the AC power therefrom. The system can further include the RAT attached to the generator, for example. Any other suitable components are contemplated herein.

In accordance with at least one aspect of this disclosure, a control system for a generator of a ram air turbine (RAT) system can include a generator control unit (GCU) configured to control an output of the generator and to operatively connect to a DC load to receive feedback from the DC load, wherein the GCU is configured to control the output of the generator as a function of the feedback to prevent stalling of a RAT and/or doorbelling voltage and/or current in the RAT system. The GCU can be any suitable embodiment of a GCU disclosed herein, e.g., as described above.

In accordance with at least one aspect of this disclosure, a method for preventing doorbelling in a generator system can include powering a DC load with a generator, charging a battery connected to the DC load in addition to powering the DC load such that a load threshold of the generator is exceeded during at least a portion of charging, and controlling an output AC voltage of the generator as a function of a current in the DC load to prevent doorbelling current and/or voltage in the system caused by disconnecting the generator from the DC load and battery. Controlling can include ramping voltage from a minimum voltage to a maximum voltage as a function of DC load current such that when the battery is below a state-of-charge (SOC) threshold, the battery continuously charges without causing doorbelling.

In certain embodiments, ramping voltage can include linearly ramping the output AC voltage. Any other suitable type of ramp (e.g., non-linear) is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
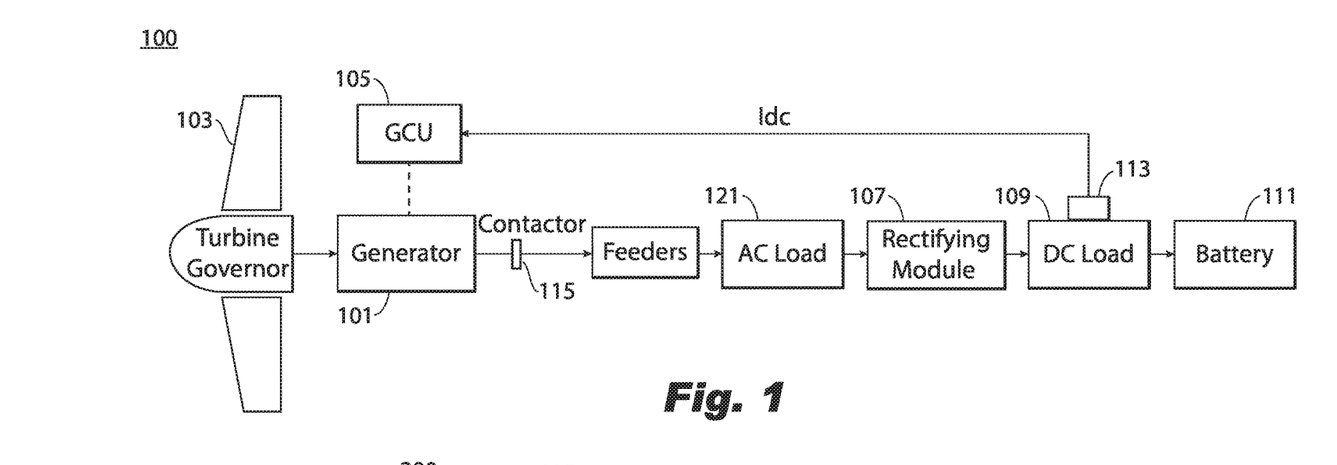
FIG. 1 is a is a schematic diagram of an embodiment of a system in accordance with this disclosure.
Figure 2:
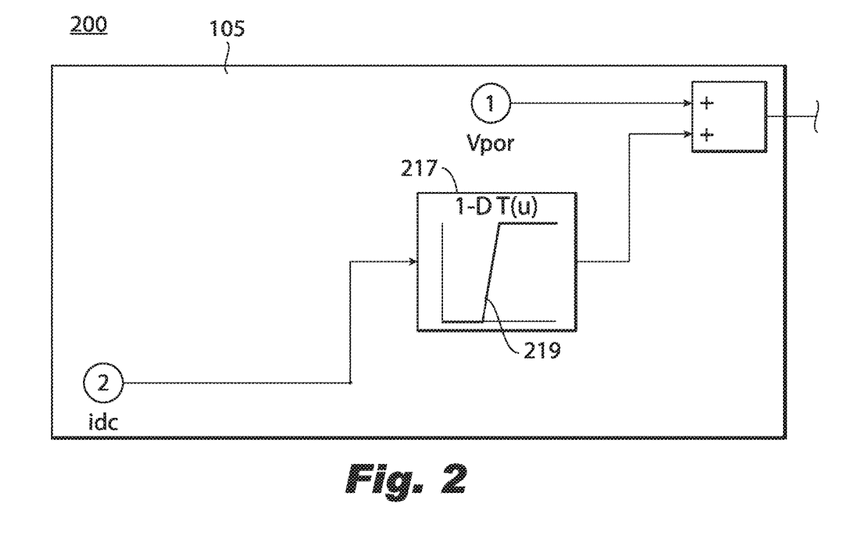
FIG. 2 shows an embodiment of a control system in accordance with this disclosure.
Figure 3A:
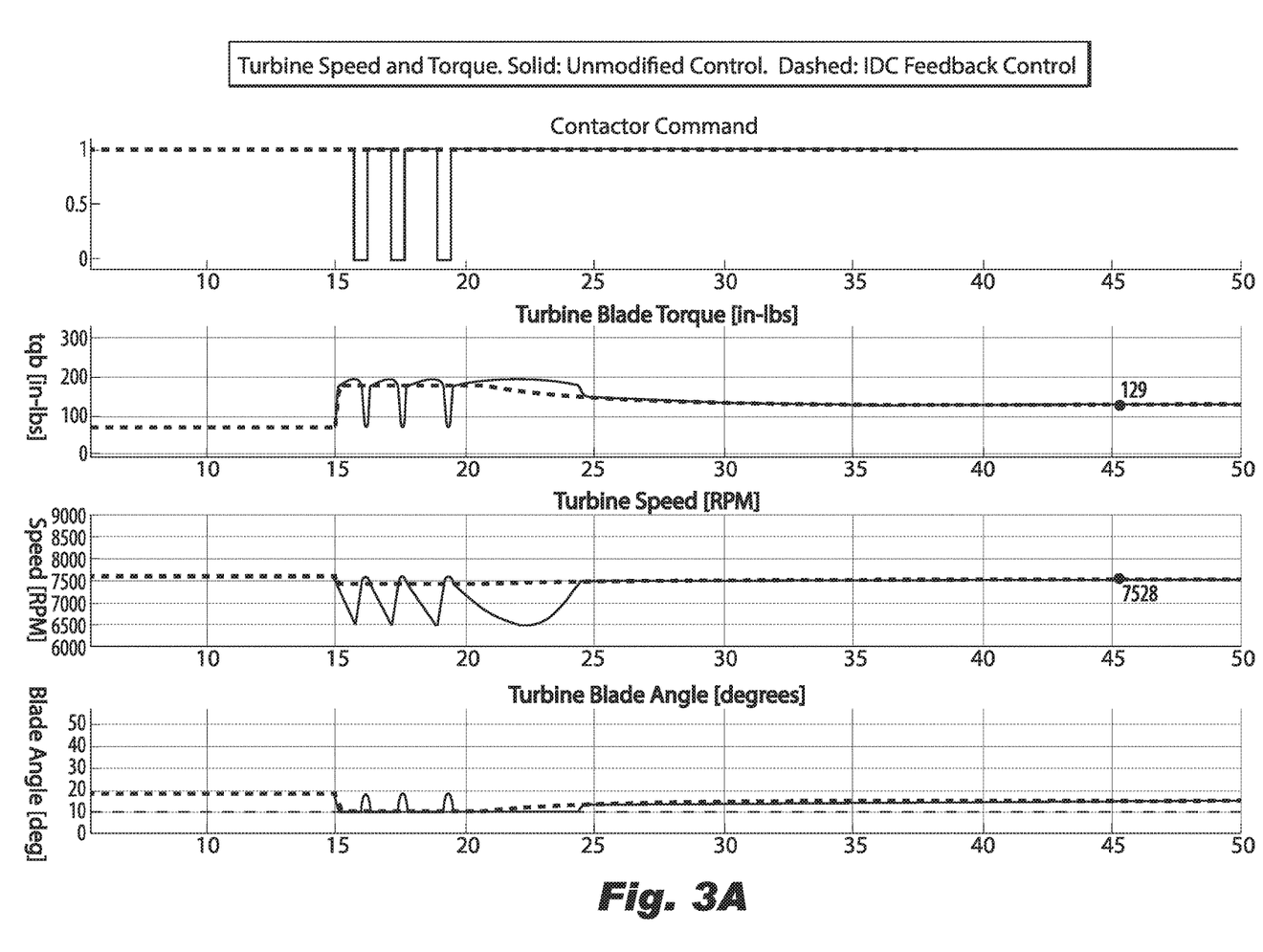
FIG. 3A shows contemporaneous charts of performance data of one or more embodiments of this disclosure against a traditional embodiment, including contactor command vs. time, turbine blade torque vs. time, turbine speed vs. time, and turbine blade angle vs. time.
Figure 3B:
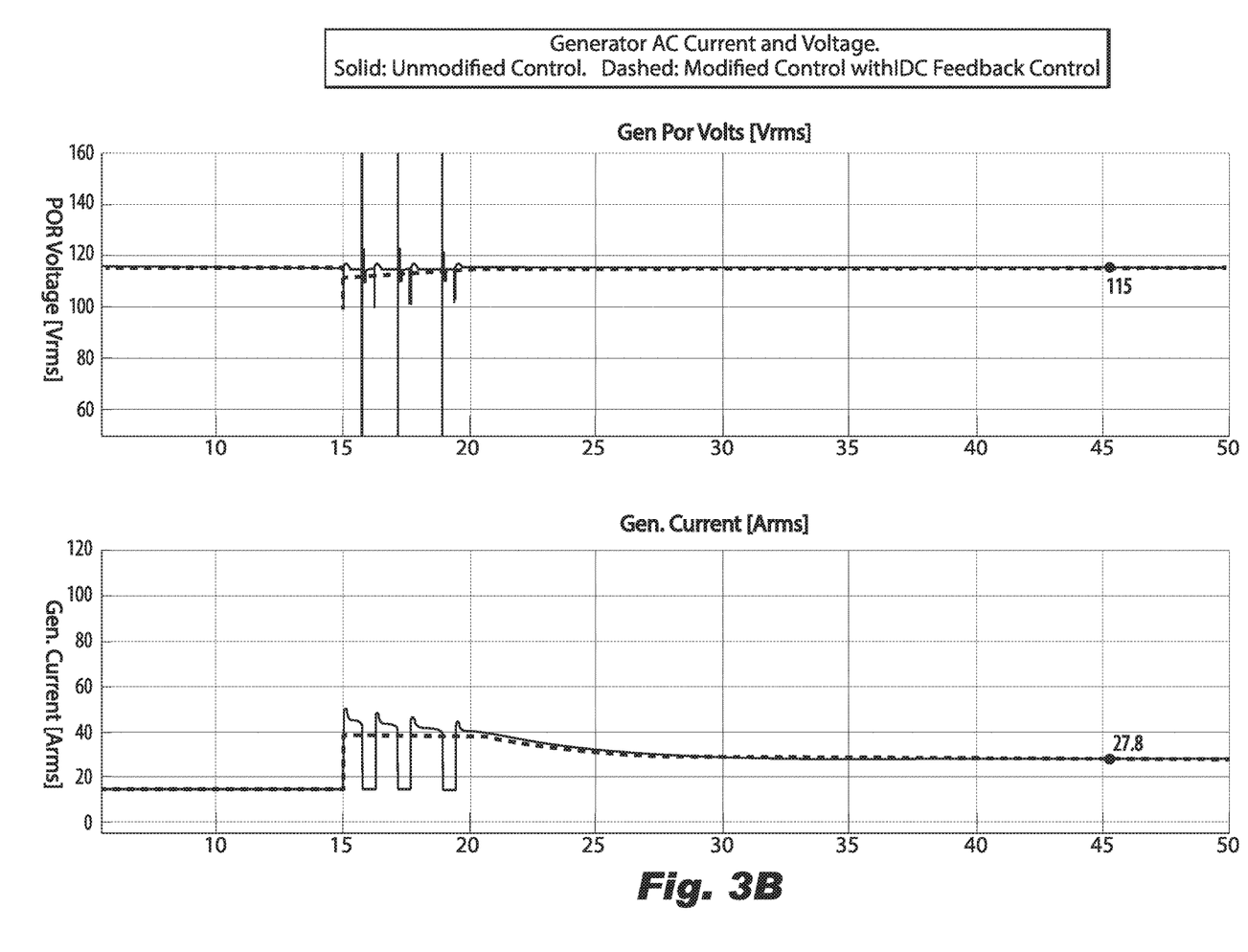
FIG. 3B shows additional contemporaneous charts of performance data of one or more embodiments of FIG. 3A, including generator voltage (Vrms) vs. time, and generator current vs. time.
Figure 3C:
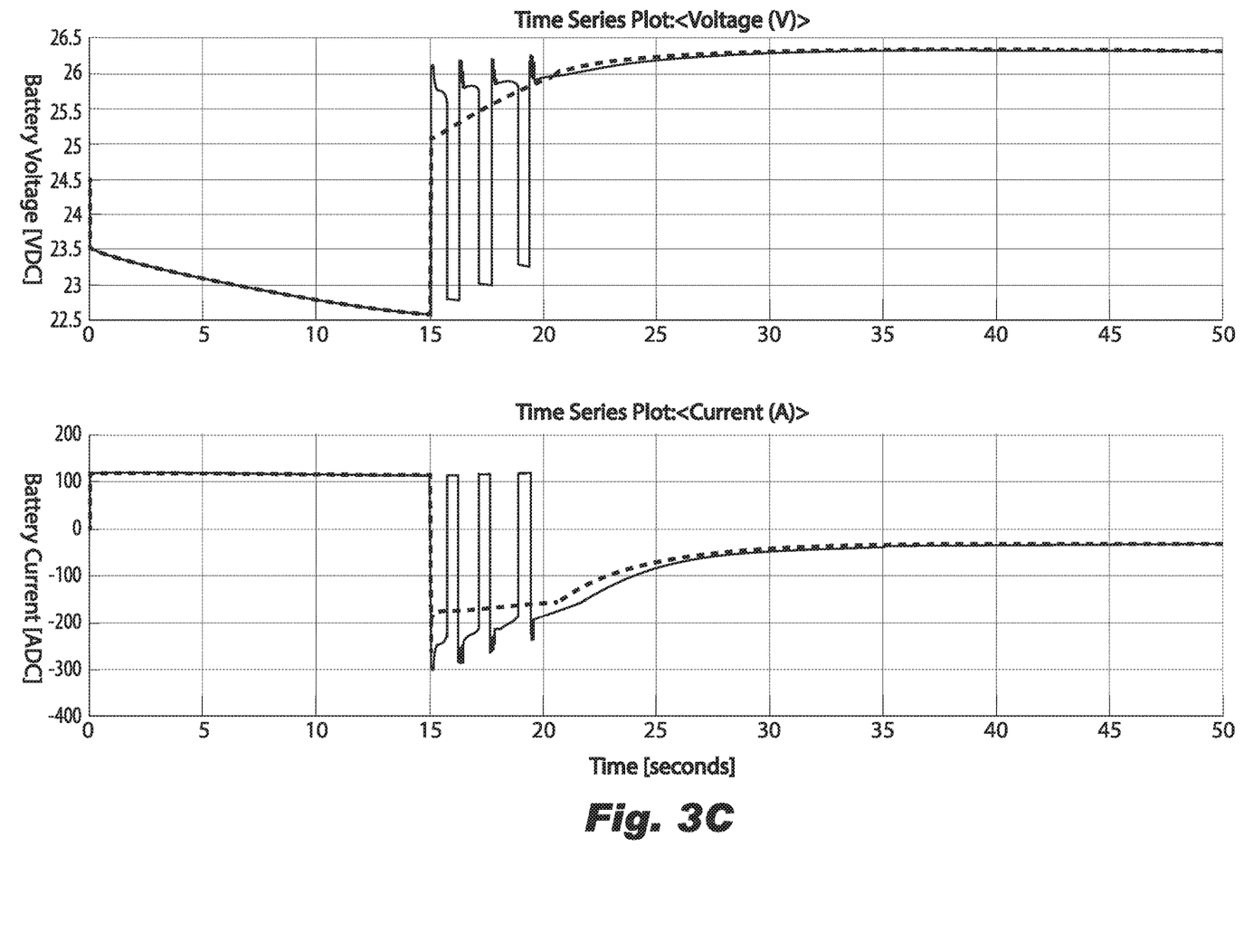
FIG. 3C shows additional contemporaneous charts of performance data of one or more embodiments of FIG. 3A, including battery voltage vs. time, and battery current vs. time.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3C. Certain embodiments described herein can be used to eliminate doorbelling in certain generator systems.

Referring to FIG. 1, a ram air turbine (RAT) system 100 can include a generator 101 configured to be turned by a RAT 103 and to output an alternating current (AC) power. The generator 101 can be or include a variable output generator and/or any other suitable type of generator as appreciated by those having ordinary skill in the art.

The system 100 can include a generator control unit (GCU) 105 configured to control an output of the generator 101. The GCU can include any suitable hardware and/or software module configured to perform any suitable function of the GCU, e.g., as described below.

The system 100 can include a rectifying module 107 configured to rectify the AC power into a direct current (DC) power. The system 100 can include a DC load 109 configured to receive the DC power from the rectifying module 107. The DC load 109 can be operatively connected to the GCU 105 to provide feedback from the DC load 109 to the GCU 105.

The GCU 105 can be configured to control the output of the generator 101 as a function of the feedback to prevent stalling of the RAT 103 and/or doorbelling current and/or voltage in the system 100 caused by disconnecting the generator from the DC load 109 (e.g., due to overloading of the generator 101). For example, the GCU 105 can be configured to reduce the output voltage of the generator 101 to prevent RAT 103 stalling when the feedback indicates a total load is at least large enough to cause stalling of the RAT 103 and/or doorbelling voltage and/or current in the system 100 (e.g., when the current in the DC load is above a DC current threshold).

The system 100 can further include a battery 111 operatively connected to the DC load 107 to power the DC load 107 when the DC load 107 is not receiving suitable power from the rectifying module 107 (e.g., when the generator 101 is disconnected). The system 100 can be configured to disconnect the AC generator 101 when a threshold load is exceeded (e.g., traditionally when the generator sees the additional load of battery 111 when battery 111 is sufficiently discharged).

For example, the battery 111 can be configured to be charged when the DC load 109 is receiving DC power from the rectifying module 107 such that the battery 111 is configured to provide an additional load seen by the generator 101 when the battery 111 is at least partially discharged. The GCU 105 can reduce an output AC voltage of the generator 101 to reduce slowing of the RAT 103 and generator 101, e.g., in response to seeing the additional load from the battery 111 to prevent disconnecting the generator 101.

The system 100 can include a current sensor 113 (e.g., a shunt, a hall effect sensor) operatively connected to the DC load 109 and the GCU 105. The DC load 109 can be operatively connected to the GCU 105 at least through the current sensor 113, for example. The feedback can include current in the DC load 109 sensed by the current sensor 113. Any other suitable feedback type is contemplated herein.

The system 100 can include an AC contactor 115 disposed between the generator 101 and the rectifying module 107. The contactor 115 can be configured to selectively connect or disconnect AC power to the rectifying module 107 (e.g., directly or indirectly). The AC contactor can be configured to open or be opened (e.g., by the GCU 105 or other suitable controller) when a total load seen by the generator 101 exceeds a total load threshold. For example, the additional load from the battery 111 can be configured to cause the system 100 to exceed the total load threshold at or below a state-of-charge (SOC) threshold (e.g., when the voltage of the battery 111 is below a sufficient threshold) of the battery 111 such that the GCU 105 is configured to reduce the output AC voltage to prevent opening of the AC contactor 115 when the battery 111 is at or below the SOC threshold.

Referring additionally to FIG. 2, the GCU 105 can be configured to look up an output AC voltage value based on the DC feedback current in a look-up table 217. The GCU 105 can be configured to receive output AC voltage (e.g., shown as Vpor) of the generator 101 and to control the AC output voltage of the generator 101 as a function of the look-up table 217 (e.g., based on DC load current feedback, shown as idc) at least when the battery 111 is below the SOC threshold. The look-up table 217 can include a linear ramp 219 such that the GCU 105 linearly ramps output voltage at least when the battery 111 is below the SOC threshold. As shown, the feedback current can be input into the look-up table 217, and the look-up table 217 can output a value to be summed with the output AC voltage to reduce the output AC voltage.

In certain embodiments, the rectifying module 107 can be a transformer rectifier unit (TRU). Any other suitable rectifier or other rectifying device is contemplated herein.

The system can further include an AC load 121 disposed between the AC contactor 115 and the TRU (e.g, rectifying module 107) to be operatively connected to the generator 101 to receive the AC power therefrom. The system 100 can further include the RAT 103 attached to the generator 101, for example. Any other suitable components are contemplated herein (e.g., a governor for controlling pitch of the RAT blades).

As shown, the DC feedback current can be fed into a look-up table, and the look-up table can provide output value to be summed with the output AC voltage value, which start at a maximum negative value, then a linear change as battery charges, then shut a minimum value (e.g., 0) to effectively disable the AC voltage reduction. Certain embodiments may can decrease voltage a small amount relative to the needs of the AC load, e.g., 5-6 volts in a 115 volt system, and eliminate the stall and/or doorbelling phenomenon, e.g., at RAT start up. In certain embodiments, the GCU can be configured to lower the voltage to no less than 100VAC, e.g., 5-10% of normal operating voltage. Embodiments can provide AC voltage feedback into the GCU so the GCU knows what output AC is.

In accordance with at least one aspect of this disclosure, a control system, e.g., 200 as shown in FIG. 2, for a generator of a ram air turbine (RAT) system, e.g., as shown in FIG. 1, can include a generator control unit (GCU) 105 configured to control an output of the generator 101 and to operatively connect to a DC load 109 to receive feedback from the DC load 109. The GCU 105 can be configured to control the output of the generator 101 as a function of the feedback to prevent stalling of a RAT 103 and/or doorbelling voltage and/or current in the RAT system 100. The GCU can be any suitable embodiment of a GCU, e.g., 105 disclosed herein, e.g., as described above.

In accordance with at least one aspect of this disclosure, a method for preventing doorbelling in a generator system can include powering a DC load with a generator, charging a battery connected to the DC load in addition to powering the DC load such that a load threshold of the generator is exceeded during at least a portion of charging, and controlling an output AC voltage of the generator as a function of a current in the DC load to prevent doorbelling current and/or voltage in the system caused by disconnecting the generator from the DC load and battery. Controlling can include ramping voltage from a minimum voltage to a maximum voltage as a function of DC load current such that when the battery is below a state-of-charge (SOC) threshold, the battery continuously charges without causing doorbelling.

In certain embodiments, ramping voltage can include linearly ramping the output AC voltage. Any other suitable type of ramp (e.g., non-linear) is contemplated herein.

Referring to FIGS. 3A-3C, embodiments can prevent the AC generator contactor from shutting off. As shown in the prior art graph, where doorbelling occurred, embodiments provide a smooth line for all of turbine blade torque, turbine speed, turbine blade angle (each of which are shown in FIG. 3A), generator voltage and current (shown in FIG. 3B), and battery voltage and current (shown in FIG. 3C). As shown in FIG. 3B, embodiments can provide a controlled, e.g., linear increase in voltage and a generally constant output current until a steady state is reached. As shown in FIGS. 3B and 3C, from time 15 to time 20, voltage on the battery and from the generator is being limited to prevent doorbelling. At about time 20 is about when voltage control is no longer needed and battery is allowed to complete charging on its own to steady state as the additional load from the battery no longer causes doorbelling.

Embodiments disclosed herein can provide RAT system battery inrush current reduction using voltage regulation foldback based on DC current measurement. In certain systems, while RAT is deploying, a battery is providing power to the DC essential load. When the RAT comes to speed, the battery voltage/state of charge is decreased, so that when the DC load can be connected to the RAT, there is a voltage difference between a TRU output voltage and battery voltage, leading to additional inrush load on the RAT. This inrush load can last up to several minutes, and add up to 5kVA to the RAT system, for example. Traditionally, if the RAT has insufficient size to deal with the additional battery load, the turbine speed can drop until the RAT stalls. At this point, either load has to be shed to keep the total load within the RAT's capability, or the RAT will doorbell between on-off states as it tries to apply the DC load with the battery and stalls out.

To solve this problem, embodiments can utilize voltage regulation foldback based on DC current to decrease the regulated voltage when the DC current is too high, for example. As shown in the data of FIGS. 3A-3C, this adjustment to reduce the AC regulation voltage during high DC current events can allow the RAT to accommodate a battery charging current without doorbelling.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A ram air turbine (RAT) system, comprising:
a generator configured to be turned by a RAT and to output an alternating current (AC) power;
a generator control unit (GCU) configured to control an output of the generator;
a rectifying module configured to rectify the AC power into a direct current (DC) power; and
a DC load configured to receive the DC power from the rectifying module, wherein the DC load is operatively connected to the GCU to provide feedback from the DC load to the GCU, wherein the GCU is configured to control the output of the generator as a function of the feedback to prevent stalling of the RAT, and/or doorbelling current and/or voltage in the system caused by disconnecting the generator from the DC load.

2. The system of claim 1, wherein the GCU is configured to reduce the output voltage of the generator to prevent RAT stalling when the feedback indicates a total load is at least large enough to cause stalling of the RAT, and/or doorbelling voltage and/or current in the system.

3. The system of claim 2, wherein the system further includes a battery operatively connected to the DC load to power the DC load when the DC load is not receiving suitable power from the rectifying module.

4. The system of claim 3, wherein the battery is configured to be charged when the DC load is receiving DC power from the rectifying module such that the battery is configured to provide an additional load seen by the generator when the battery is at least partially discharged, wherein the GCU reduces an output AC voltage of the generator to reduce slowing of the RAT and generator.

5. The system of claim 4, wherein the system includes a current sensor operatively connected to the DC load and the GCU, wherein the DC load is operatively connected to the GCU at least through the current sensor, wherein the feedback includes current in the DC load sensed by the current sensor.

6. The system of claim 4, further comprising an AC contactor disposed between the generator and the rectifying module, wherein the contactor is configured to selectively connect or disconnect AC power to the rectifying module, wherein the AC contactor is configured to open or be opened when a total load seen by the generator exceeds a total load threshold.

7. The system of claim 6, wherein the additional load from the battery is configured to cause the system to exceed the total load threshold at or below a state-of-charge (SOC) threshold of the battery such that the GCU is configured to reduce the output AC voltage to prevent opening of the AC contactor when the battery is at or below the SOC threshold.

8. The system of claim 7, wherein the GCU is configured to look up an output AC voltage value based on the DC feedback current in a look-up table, wherein the GCU is configured to receive output AC voltage of the generator and to control the AC output voltage of the generator as a function of the look-up table at least when the battery is below the SOC threshold.

9. The system of claim 8, wherein the look-up table includes a linear ramp such that the GCU linearly ramps output voltage at least when the battery is below the SOC threshold.

10. The system of claim 7, wherein the rectifying module is a transformer rectifier unit (TRU), wherein the system further includes an AC load disposed between the AC contactor and the TRU to be operatively connected to the generator to receive the AC power therefrom.

11. The system of claim 10, further comprising the RAT attached to the generator.

12. A control system for a generator of a ram air turbine (RAT) system, comprising: a generator control unit (GCU) configured to control an output of the generator and to operatively connect to a DC load to receive feedback from the DC load, wherein the GCU is configured to control the output of the generator as a function of the feedback to prevent stalling of a RAT, and/or doorbelling voltage and/or current in the RAT system.

13. The system of claim 12, wherein the GCU is configured to reduce the output voltage of the generator to prevent RAT stalling when the feedback indicates a total load is at least large enough to cause stalling of the RAT, and/or doorbelling voltage and/or current in the system.

14. The system of claim 13, wherein the GCU is configured to look up an output AC voltage value based on the DC feedback current in a look-up table, wherein the GCU is configured to receive output AC voltage of the generator and to control the AC output voltage of the generator as a function of the look-up table between at least when a battery is below a state-of-charge (SOC) threshold.

15. The system of claim 14, wherein the look-up table includes a linear ramp such that the GCU linearly ramps output voltage at least when the battery is below the SOC threshold.

16. A method for preventing doorbelling in a generator system, comprising:
powering a DC load with a generator;
charging a battery connected to the DC load in addition to powering the DC load such that a load threshold of the generator is exceeded during at least a portion of charging; and
controlling an output AC voltage of the generator as a function of a current in the DC load to prevent doorbelling current and/or voltage in the system caused by disconnecting the generator from the DC load and battery.

17. The method of claim 16, wherein controlling includes ramping voltage from a minimum voltage to a maximum voltage as a function of DC load current such that when the battery is below a state-of-charge (SOC) threshold, the battery continuously charges without causing doorbelling.

18. The method of claim 17, wherein ramping voltage includes linearly ramping the output AC voltage.

* * * * *